(12) United States Patent
Naskar et al.

(10) Patent No.: US 9,941,058 B2
(45) Date of Patent: Apr. 10, 2018

(54) FLEXIBLE AND CONDUCTIVE WASTE TIRE-DERIVED CARBON/POLYMER COMPOSITE PAPER AS PSEUDOCAPACITIVE ELECTRODE

(71) Applicant: UT-Battelle, LLC

(72) Inventors: Amit K Naskar, Knoxville, TN (US); Mariappan Parans Paranthaman, Knoxville, TN (US); Muhammad Boota, Philadelphia, PA (US); Yury Gogotsi, Ivyland, PA (US)

(73) Assignees: UT-BATTELLE, LLC, Oak Ridge, TN (US); DREXEL UNIVERSITY, Philadelphia, PA (US)

( * ) Notice: Subject to any disclaimer, the term of this patent is extended or adjusted under 35 U.S.C. 154(b) by 112 days.

(21) Appl. No.: 14/852,073

(22) Filed: Sep. 11, 2015

(65) Prior Publication Data
US 2016/0351346 A1  Dec. 1, 2016

Related U.S. Application Data

(60) Provisional application No. 62/166,244, filed on May 26, 2015.

(51) Int. Cl.
*H01G 11/32* (2013.01)
*H01G 11/34* (2013.01)
(Continued)

(52) U.S. Cl.
CPC ............ *H01G 11/34* (2013.01); *H01G 11/38* (2013.01); *H01G 11/44* (2013.01); *H01G 11/86* (2013.01); *Y02E 60/13* (2013.01)

(58) Field of Classification Search
CPC ........ H01G 11/04; H01G 11/42; H01G 11/48; H01G 11/32; H01G 11/66; H01G 11/34
See application file for complete search history.

(56) References Cited

U.S. PATENT DOCUMENTS 3,823,221 A  7/1974  Wakefield et al.
3,886,088 A  5/1975  DeJong
(Continued)

FOREIGN PATENT DOCUMENTS

CN  101003695 A  7/2007
CN  102214516 A  10/2011
(Continued)

OTHER PUBLICATIONS

Naskar et al.: "Tailored recovery of carbons from waste tires for enhanced performance as anodes in lithium-ion batteries." RSC Adv., 2014, 4, 38213.
(Continued)

*Primary Examiner* — Nguyen Ha
(74) *Attorney, Agent, or Firm* — Fox Rothschild LLP

(57) ABSTRACT

A method of making a supercapacitor from waste tires, includes the steps of providing rubber pieces and contacting the rubber pieces with a sulfonation bath to produce sulfonated rubber; pyrolyzing the sulfonated rubber to produce a tire-derived carbon composite comprising carbon black embedded in rubber-derived carbon matrix comprising graphitized interface portions; activating the tire-derived carbon composite by contacting the tire-derived carbon composite with a specific surface area-increasing composition to increase the specific surface area of the carbon composite to provide an activated tire-derived carbon composite; and, mixing the activated tire-derived carbon composite with a monomer and polymerizing the monomer to produce a redox-active polymer coated, activated tire-derived carbon composite. The redox-active polymer coated, activated tire-derived carbon composite can be formed into a film. An electrode and a supercapacitor are also disclosed.

58 Claims, 8 Drawing Sheets

(51) Int. Cl.
*H01G 11/86* (2013.01)
*H01G 11/38* (2013.01)
*H01G 11/44* (2013.01)

(56) References Cited

U.S. PATENT DOCUMENTS

| | | | |
|---|---|---|---|
| 4,002,587 A | 1/1977 | Watanabe et al. | |
| 5,728,361 A | 3/1998 | Holley | |
| 5,744,668 A | 4/1998 | Zhou et al. | |
| 5,961,946 A | 10/1999 | Takegawa et al. | |
| 5,965,479 A | 10/1999 | Suzuki et al. | |
| 6,297,293 B1 | 10/2001 | Bell et al. | |
| 6,547,710 B1* | 4/2003 | Patel | C08C 19/04 |
| | | | 525/332.8 |
| 6,737,445 B2 | 5/2004 | Bell et al. | |
| 6,802,897 B1 | 10/2004 | Lackey et al. | |
| 6,919,063 B2 | 7/2005 | Jang et al. | |
| 7,416,641 B2 | 8/2008 | Denison | |
| 7,497,929 B2 | 3/2009 | Karpetsky et al. | |
| 7,947,248 B2 | 5/2011 | Hamby et al. | |
| 7,993,780 B2 | 8/2011 | Jang et al. | |
| 8,013,130 B2 | 9/2011 | Yanagawa et al. | |
| 8,575,281 B2 | 11/2013 | Yanagawa et al. | |
| 9,441,113 B2 | 9/2016 | Naskar et al. | |
| 2002/0065333 A1 | 5/2002 | Bell et al. | |
| 2002/0114126 A1* | 8/2002 | Hirahara | C01B 31/081 |
| | | | 361/302 |
| 2008/0227996 A1 | 9/2008 | Hara et al. | |
| 2009/0136849 A1 | 5/2009 | Yue et al. | |
| 2012/0263641 A1 | 10/2012 | Chung et al. | |
| 2014/0371385 A1 | 12/2014 | Verberne et al. | |
| 2015/0017528 A1 | 1/2015 | Roberts et al. | |
| 2015/0021525 A1 | 1/2015 | Naskar et al. | |
| 2016/0254543 A1 | 9/2016 | Naskar et al. | |
| 2016/0351346 A1 | 12/2016 | Naskar et al. | |

FOREIGN PATENT DOCUMENTS

| | | |
|---|---|---|
| FR | 2357616 A1 | 2/1978 |
| KR | 101147788 B1 | 5/2012 |
| WO | 200129150 | 4/2001 |
| WO | 2011010323 A1 | 1/2011 |

OTHER PUBLICATIONS

Zhi et al.: "Effects of Pore Structure on Performance of an Activated-Carbon Supercapacitor Electrode Recycled from Scrap Waste Tires", ACS Sustainable Chem. Eng. 2014, 2, 1592-1598.

"Biochar based solid acid catalyst for biodiesel production," Amir Mehdi Dehkhoda et al. Applied Catalysis A: General 382 (2010), pp. 197-204.

"New sulfonic acid ion-exchange resins for the preesterification of different oils and fats with high content of free fatty acids," Bernhard M. E. Russbueldt, et al. Applied Catalysis A: General 362 (2009), pp. 47-57.

Shu et al.: "Synthesis of biodiesel from waste vegetable oil with large amounts of free fatty acids using a carbon-based solid acid catalyst", J. Applied Energy 2010, 87, 2589.

Canakci et al.: "A Pilot Plant to Produce Biodiesel from High Free Fatty Acid Feedstocks", Presentation at 2001 ASAE Annual International Meeting; Sacramento Convention Center, Sacramento, CA, Jul. 30-Aug. 1, 2001.

Ma et al.: "Biodiesel production: a review", Bioresource technology 1999, 70, 1.

Peng et al.: "Biodiesel production from waste oil feedstocks by solid acid catalysis", Process Safety and Environmental Protection 2008, 86, 441.

Boota et al.: "Waste Tire Derived Carbon-Polymer Composite Paper as Pseudocapacitive Electrode with Long Cycle Life", ChemSusChem 2015, 8, 3576.

Naskar et al.: "Tailored recovery of carbons from waste tires for enhanced performance as anodes in lithium-ion batteries", RSC Advances 2014, 4, 38213.

Zhi et al.: "Effects of Pore Structure on Performance of an Activated-Carbon Supercapacitor Electrode Recycled from Scrap Waste Tires", ACS Sustainable Chemistry & Engineering 2014, 2, 1592.

Chen et al.: "Gold Nanocages: Bioconjugation and Their Potential Use as Optical Imaging Contrast Agents", Nano letters 2005, 5, 473.

Deshmane et al.: "A comparative study of solid carbon acid catalysts for the esterification of free fatty acids for biodiesel production. Evidence for the leaching of colloidal carbon", Bioresource technology 2013, 147, 597.

Toda et al.: "Green chemistry: Biodiesel made with sugar catalyst", Nature 2005, 438, 178.

Shu et al.:"Synthesis of biodiesel from cottonseed oil and methanol using a carbon-based solid acid catalyst", Fuel Processing Technology 2009, 90, 1002.

Jacobson et al.: "Solid acid catalyzed biodiesel production from waste cooking oil" Applied Catalysis B: Environmental 2008, 85, 86.

Sani, Y. et al.:"Activity of solid acid catalysts for biodiesel production: A critical review", Applied Catalysis A: General 2014, 470, 140.

Hummers et al., "Preparation of graphitic oxide", J Am Chem Soc (1958) 80(6): 1339.

Lin et al., "Surface functional characteristics (C, 0, S) of waste tire-derived carbon black before and after steam activation", J Atr & Waste Manage. Assoc. (2008) 58: 78-84.

Tang et al., "Thermal plasma pyrolysis of used tires for carbon black recovery", Journal of Materials Science (2005) 40(14): 3817-3819.

Wojtowicz et al., "Carbon black derived from waste tire pyrolysis", Advanced Fuel Research, Inc. (n.d.). (7 pages).

J. Voelcker, Green Car Reports, 2014.

San Miguel et al. "Pyrolysis of Tire Rubber: Porosity and Adsorption Characteristics of the Pyrolytic Chars",, Ind. Eng. Chem. Res., 2006, 37, 2430-2435.

A. Quek et. al: "Liquefaction of waste tires by pyrolysis for oil and chemicals—A review", J. Anal. Appl. Pyrolysis, 2013, 101, 1-16.

F. Béguin et al.: "Carbons and Electrolytes for Advanced Supercapacitors", Adv. Mater., 2014, 26, 2219-2251.

P. Simon et al.: "Charge storage mechanism in nanoporous", Trans. A. Math. Phys. Eng. Sci., 2010, 368, 3457-3467.

M.-M. Titirici, et al.: "Sustainable carbon materials", Chem. Soc. Rev., 2015, 44, 250-290.

E. M. Lotfabad et al.: "High-Density Sodium and Lithium Ion Battery Anodes from Banana Peels", ACS Nano, 2014, 8, 7115-7129.

H. Wang et al.: "Interconnected Carbon Nanosheets Derived from Hemp for Ultrafast Supercapacitors with High Energy", ACS Nano, 2013, 7, 5131-41.

J. Jiang et al.: "Evolution of disposable bamboo chopsticks into uniform carbon ?bers: a smart strategy to fabricate sustainable anodes for Li-ion batteries", Energy Environ. Sci., 2014, 7, 2670-2679.

L.-F. Chen et al.: "Flexible all-solid-state high-power supercapacitor fabricated with nitrogen-doped carbon nano?ber electrode material derived from bacterial cellulose", Energy Environ. Sci., 2013, 6, 3331.

M. Biswal et al.: "From dead leaves to high energy density supercapacitors", Energy Environ. Sci., 2013, 6, 1249.

P. Chen et al.: "Nitrogen-doped nanoporous carbon nanosheets derived from plant biomass: an efficient catalyst for oxygen reduction reaction", Energy Environ. Sci., 2014, 7, 4095-4103.

W. Qian et al.: "Human hair-derived carbon ?akes for electrochemical supercapacitors", Energy Environ. Sci., 2013, 379-386.

J. Ding et al.: "Peanut shell hybrid sodium ion capacitor with extreme energy-power rivals lithium ion capacitors", Energy Environ. Sci., 2015, 8, 941-955.

J. Zhang et al.: "On the Configuration of Supercapacitors for Maximizing Electrochemical Performance", ChemSusChem, 2012, 5, 818-41.

(56) References Cited

OTHER PUBLICATIONS

T. Liu et al.: "Polyaniline and Polypyrrole Pseudocapacitor Electrodes with Excellent Cycling Stability", Nano Lett., 2014, 14, 2522-2527.
G. Wang et al."A review of electrode materials for electrochemical supercapacitors", Chem. Soc. Rev., 2012, 41, 797.
A. K. Naskar et al.: "Tailored recovery of carbons from waste tires for enhanced performance as anodes in lithium-ion batteries", RSC Adv., 2014, 4, 38213.
L. Wei et al.: "Hydrothermal Carbonization of Abundant Renewable Natural Organic Chemicals for High-Performance Supercapacitor Electrodes", Adv. Energy Mater., 2011, 1, 356-361.
J. Huang et al.: "Nanofiber Formation in the Chemical Polymerization of Aniline: A Mechanistic Study". Chemie—Int. Ed., 2004, 43, 5817-5821.
M. Boota et al.: "Towards High-Energy-Density Pseudocapacitive Flowable Electrodes by the Incorporation of Hydroquinone" ChemSusChem, 2015, 8, 835-843.
K. B. Hatzell et al.: "Effect of Oxidation of Carbon Material on Suspension Electrodes for Flow Electrode Capacitive Deionization", Environ. Sci. Technol., 2015, 150211062348002.
M. Boota, et al.: "Graphene-containing flowable electrodes for capacitive energy storage" Carbon N. Y., 2015, 92, 142-149.
C. Zhang et al.: "Highlyporouscarbonspheresforelectrochemicalcapacitorsandcapacitiveflowablesuspensionelectrodes", Carbon N. Y., 2014, 77, 155-164.
M. Tagowska et al.: "Polyaniline nanotubules-anion effect on conformation and oxidation state of polyaniline studied by Raman Spectroscopy", Synth. Met., 2004, 142, 223-229.
S. Sharma et al.: "Chloroform vapour sensor based on copper/polyaniline nanocomposite", Sensors Actuators, B Chem., 2002, 85, 131-136.
M. A. Islam et al.: "Mesoporous and adsorptive properties of palm date activated carbon prepared via sequential hydrothermal carbonization and sodium hydroxide activation", Chem. Eng. J., 2015, 270, 187-195.
M. Boota et al.: "Activated Carbon Spheres as a Flowable Electrode in Electrochemical Flow Capacitors", Electrochem. Soc., 2014, 161, A1078-A1083.
K. B. Hatzell et al.: "Flowable Conducting Particle Networks in Redox-Active Electrolytes for Grid Energy Storage", J. Electrochem. Soc., 2015, 162, A5007-A5012.
J. Xu et al.: "Hierarchical Nanocomposites of Polyaniline Nanowire Arrays on Graphene Oxide Sheets with Synergistic Effect for Energy Storage", ACS Nano, 2010, 4, 5019-5026.
H.-P. Cong et al.: "Flexible graphene-polyaniline composite paper for high-performance supercapacitor", Energy Environ. Sci., 2013, 6, 1185.
Y. Zhou et al.: "Polyaniline/multi-walled carbon nanotube composites with core-shell structures as supercapacitor electrode materials", Electrochim. Acta, 2010, 55, 3904-3908.
X. Xia et. al.: "Reduced-graphene oxide/molybdenum oxide/polyaniline ternary composite for high energy density supercapacitors: Synthesis and properties" J. Mater. Chem., 2012, 22, 8314.
K. B. Hatzell et al.:"Composite Manganese Oxide Percolating Networks As a Suspension Electrode for an Asymmetric Flow Capacitor", ACS Appl. Mater. Interfaces, 2014, 6, 8886-8893.
Q. Wu et al.: "Supercapacitors Based on Flexible Graphene/Polyaniline Nanofiber Composite Films" ACS Nano, 2010, 4, 1963-1970.
Z. Lei et al.: "Growth of Polyaniline on Hollow Carbon Spheres for Enhancing Electrocapacitance", J. Phys. Chem. C, 2010, 114, 19867-19874.
X. Wang et al.: Crosslinked polyaniline nanorods with improved electrochemical performance as electrode material for supercapacitors, J. Mater. Chem. A, 2014, 2, 12323.
C. Xia et al.: "Highly Stable Supercapacitors with Conducting Polymer Core-Shell electrodes for Energy Storage Applications", Adv. Energy Mater., 2015.
L. Wang et al.: "Hierarchical Nanocomposites of Polyaniline Nanowire Arrays on Reduced Graphene Oxide Sheets for Supercapacitors" Sci. Rep., 2013, 3, 3568.
A. Du Pasquier et al.: "Li4Ti5O12/poly(methyl)thiophene asymmetric hybrid electrochemical device" J. Power Sources, 2004, 125, 95-102.
J. S. Lee et al.: "A metal-oxide nano?ber-decorated three dimensional graphene hybrid nanostructured ?exible electrode for high-capacity electrochemical capacitors", J. Mater. Chem. A, 2014, 2, 11922.
R. B. Rakhi et al.: "Conducting polymer/carbon nanocoil composite electrodes for efficient supercapacitors", J. Mater. Chem., 2012, 22, 5177.

\* cited by examiner

FLEXIBLE AND CONDUCTIVE WASTE TIRE-DERIVED CARBON/POLYMER COMPOSITE PAPER AS PSEUDOCAPACITIVE ELECTRODE

CROSS REFERENCE TO RELATED APPLICATIONS

This application claims priority to U.S. Provisional Patent Application No. 62/166,244, filed May 26, 2015, titled "HIGHLY FLEXIBLE AND CONDUCTIVE WASTE TIRE-DERIVED CARBON/POLYMER COMPOSITE PAPER AS ULTRA-LONG CYCLE LIFE PSEUDOCAPACITIVE ELECTRODE," the entire contents of which are incorporated herein by reference.

STATEMENT REGARDING FEDERALLY SPONSORED RESEARCH

This invention was made with government support under contract No. DE-AC05-00OR22725 awarded by the U.S. Department of Energy. The government has certain rights in this invention.

FIELD OF THE INVENTION

This invention relates generally to electrodes, and more particularly to supercapacitor electrodes.

BACKGROUND OF THE INVENTION

As the world population is increasing, the number of vehicles is expected to increase from 1.2 billion to 2 billion by 2035. This results in the production of nearly 1.5 billion tires per year, which inevitably turn into waste. These discarded tires pose serious environmental and health issues such as: 1) piles of the waste tires generate vermin and insect infestation, which pose a severe health issue; 2) if piles of waste tires catch fire, it is hard to extinguish and moreover burning tires generate hazardous gases, heavy metals and oil which severely contaminate soil, environment and groundwater; and 3) waste tires require large landfills and increasing number of discarded tires may lead to landfill maintenance issues.

Owing to their cross-linked structure and presence of various additives, waste tires do not decompose easily and resist degradation in most of the chemically and physically harsh conditions. As a result, they are generally disposed of and accumulate in landfills, which is an unsustainable solution. The best solution economically and ecologically would be to recycle waste tires and use them as a raw material for value-added products. A typical tire contains natural rubber and polybutadiene, styrene butadiene rubber, butyl rubber and fractional amounts of organic and inorganic fillers/additives. Carbon black is the major constituent of the tire (~30-35% by weight), which provides an avenue to recover this carbon for energy related applications. A method of recovering carbon black from waste tires is disclosed in U.S. patent application Ser. No. 13/945,239, "Pyrolytic Carbon Black Composite and Method of Making the Same," filed Jul. 18, 2013, the disclosure of which is incorporated fully by reference.

In spite of the significant efforts to develop carbon-based materials for supercapacitors, such as reduced graphene oxide (rGO), multiwall carbon nanotubes (MWCNT), carbide derived carbons (CDC), and onion-like carbons (OLC), activated carbon (AC) still remains the material of choice for commercial supercapacitors due to its moderate cost, high specific surface area (SSA), good conductivity, high electrochemical performance and compatibility with other materials, for example, conducting polymers. Therefore, inexpensive synthesis of AC with developed porosity using biomass, waste products or other low cost and environmentally benign precursors has been explored for the development of next generation supercapacitor technology.

Towards this goal, synthesis of the AC from biomass and waste products has gained significant interest recently. For example, Wang et al produced high surface area (up to 2287 $m^2/g$) nanosheets from hemp bast fibers, which demonstrated high charge storage capacity of 106 F/g at 0° C., at current density of 10 A/g in ionic liquids. Elmira et al. derived low surface area carbon from banana peels. When tested as a lithium-ion battery anode, the recovered carbon showed high gravimetric capacity of 1090 mAh/g at 50 mA/g. Jian et al. reported the recovery of carbon fibers from disposable bamboo chopsticks, which have abundant natural cellulose fibers. These carbon fibers in combination with manganese oxide yielded a capacity of 710 mAh/g for 300 cycles, when tested as lithium-ion battery anode. Li-Feng et al. pyrolyzed nitrogen doped bacterial cellulose to synthesize nitrogen rich carbon, which demonstrated 195 F/g capacitance at 1 A/g. Mandakini et al. pyrolyzed dead leaves to recover carbon (SSA 1230 $m^2/g$), which yielded 88 F/g capacitance in organic electrolytes. Ping et al. used plant derived nitrogen rich carbon as a catalyst for the oxygen reduction reaction. Wenjing et al. derived heteroatom doped porous carbon by carbonizing human hairs, which exhibited a capacitance of 340 F/g at a current density of 1 A/g. Jia et al. synthesized carbon from the peanut shell for sodium-ion capacitor with a high rate capability of 72% after 10,000 cycles. Other waste materials used as carbon source include agricultural waste, rice husk, newspapers, wood and coffee.

A major limitation of AC materials is their poor energy density. To enhance the energy density, various approaches have been explored such as use of the pseudocapacitive materials (e.g., metal oxides or organic redox polymers) on conductive substrates, use of asymmetric configuration with expanded voltage windows, among others. Organic redox polymers, such as polyaniline (PANI), are promising pseudocapacitive materials because they are highly conductive, offer enhanced capacitance, and are environmental friendly and low cost materials. However, its large volume expansion and shrinkage during the doping/dedoping process leads to structural breakdown and limited lifetime performances. Most organic conducting redox-active polymers based electrodes lose more than 50% of their capacitance after 1000 cycles. One common strategy to improve the lifetime of organic-systems is to create composite materials based on strong conducting substrates such as carbon. Various attempts have been made to synthesize composites of PANI with various conductive substrates such as CNTs, rGO, metal oxides, GO (non-conductive), CDC, OLC, to benefit from the synergistic effects of both polymers and carbon materials. However, some of them rely on tedious synthesis methods and use toxic/explosive chemicals during the synthesis process.

SUMMARY OF THE INVENTION

A method of making a supercapacitor from waste tires, includes the steps of providing rubber pieces and contacting the rubber pieces with a sulfonation bath to produce sulfonated rubber; pyrolyzing the sulfonated rubber to produce tire-derived carbon composite comprising carbon black embedded in carbon matrix derived from sulfonated rubber and thus depending on the temperature of carbonization carbon composite comprising graphitized interface portions; activating the tire-derived carbon composite by contacting the tire-derived carbon composite with a specific surface area-increasing composition to increase the specific surface area of the carbon composite to provide activated tire-derived carbon composite; mixing the activated tire-derived carbon composite with a monomer and polymerizing the monomer to produce a redox-active polymer coated, activated tire-derived carbon composite; and forming the redox-active polymer coated, activated tire-derived carbon composite into a film.

The method can further comprise the step of forming the redox-active polymer coated, activated tire-derived carbon film into an electrode. The method can include the step of forming a supercapacitor comprising the electrode. The supercapacitor can be a pseudocapacitor.

The graphitized interface portions can comprise 10%-40% of the tire-derived carbon composite, by weight. The temperature of the sulfonation bath can be between −20° C. to 200° C. The rubber pieces can be contacted with the sulfonation bath for between 30 minutes and 5 days. The pyrolyzing can include heating to at least 200° C. to 2400° C. The pyrolyzing can include at least two stage heating. A first stage heating can include heating to between room temperature and 400° C. at 1° C./min, and a second stage heating comprises heating to between 400 and 2400° C. at 2° C./min. The heating rates in both stages can be as high as 50° C./min. The pyrolyzing time can be between 1 min and 24 hours. The pyrolyzing can be conducted in an inert atmosphere. The graphitized portion can have a layer spacing of between 3.5-4.7 angstroms.

The activating step can include contacting the tire-derived carbon with at least one selected from the group consisting of KOH, $CO_2$ or $ZnCl_2$. The KOH can be mixed with the tire-derived carbon at a weight ratio of between 1:2 and 1:10.

The pore size after the activating step can include micropores of less than 2 nm, and mesopores of 2-10 nm. The mesopores can be 3-5 nm. The pores can be between 70%-90% micropores and between 10%-30% mesopores. The specific surface area after the activating step can be between 1000-2000 $m^2/g$.

The tire-derived carbon can be mixed with monomer and oxidant at a ratio of (x) Monomer:(y) Oxidant:(z) tire-carbon where x=20-40%, y=20-40%, and z=30-50%. The oxidant can be at least one selected from the group consisting of ammonium persulfate, iron chloride, and potassium dichromate. The redox-active polymer can include at least one selected from the group consisting of polyaniline, polypyrrole, and polythiophene. The polymer can comprise 50%-90% of the redox-active polymer coated, activated tire-derived carbon composite, by weight.

The tire rubber pieces can be between 100 nm and 2 inches. The tire rubber pieces can include particles of between 100 nm and 0.5 mm and rubber crumbs of between 0.5 mm to 2 inches.

The electrode can have capacitance retention of over 95% after 10,000 cycles. The electrode can have a capacitance of over 450 F/g at a scan rate of 1 mV/s, of over 200 F/g at a scan rate of 10 mV/s, and over 150 F/g at a scan rate of 100 mV/s.

The film-forming step can include mixing the redox-active polymer coated, activated tire-derived carbon, carbon black, and a binder in a solvent, evaporating the solvent to produce a film-forming mixture, and applying pressure to the film-forming mixture to form the film.

The conductivity of the films can be between 50-200 S/m. The films can be bent to 180°.

An electrode can include a tire-derived carbon composite comprising carbon black embedded in carbon matrix from sulfonated rubber, the matrix carbon comprising temperature-dependent partially graphitized interface portions on the carbon black particles and being activated, and coated with a redox-active polymer to provide a redox-active polymer coated, activated tire-derived carbon composite. The redox-active polymer coated, activated tire-derived carbon composite can be provided as a film, the film further including carbon black and a binder.

The graphitized interface portions can be 10%-40% of the tire-derived carbon composite, by weight. The polymer can include 50%-90%, by weight, of the redox-active polymer coated, activated tire-derived carbon composite. The pore size after the activating step can include micropores of less than 2 nm, and mesopores of 2-10 nm. The mesopores can be 3-5 nm. The pores can be between 70%-90% micropores and between 10%-30% mesopores.

A supercapacitor can include an electrode, the electrode comprising a redox-active polymer coated, tire-derived carbon composite comprising carbon black embedded in sulfonated rubber-based carbon matrix, the carbon composite comprising graphitized interface portions and being activated and coated with the redox-active polymer to provide a redox-active polymer coated, activated tire-derived carbon composite electrode.

The supercapacitor can have capacitance retention of over 95% after 10,000 cycles. The supercapacitor can have a capacitance of over 450 F/g at a scan rate of 1 mV/s, of over 200 F/g at a scan rate of 10 mV/s, and over 150 F/g at a scan rate of 100 mV/s.

A method of making a supercapacitor from rubber, comprising the steps of providing rubber pieces; contacting the rubber pieces with a sulfonation bath to produce sulfonated rubber; pyrolyzing the sulfonated rubber to produce carbon composite comprising graphitized interface portions; activating the carbon composite by contacting the carbon composite with a specific surface area-increasing composition to increase the specific surface area of the carbon composite to provide an activated carbon composite; mixing the activated carbon composite with a monomer and polymerizing the monomer to produce a redox-active polymer coated, activated carbon composite; and forming the redox-active polymer coated, activated carbon composite into a film. The rubber can include carbon black as filler and thereby it can produce carbon black embedded carbon matrix with graphitized interfaces of different degrees depending on the pyrolysis temperature.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

A method of making a supercapacitor from waste tires or other rubber sources begins with providing rubber pieces and contacting the rubber pieces with a sulfonation bath to produce sulfonated rubber. The rubber pieces can include carbon black filled crosslinked rubber chunks. Carbon black is amorphous or noncrystalline.

Figure 1:
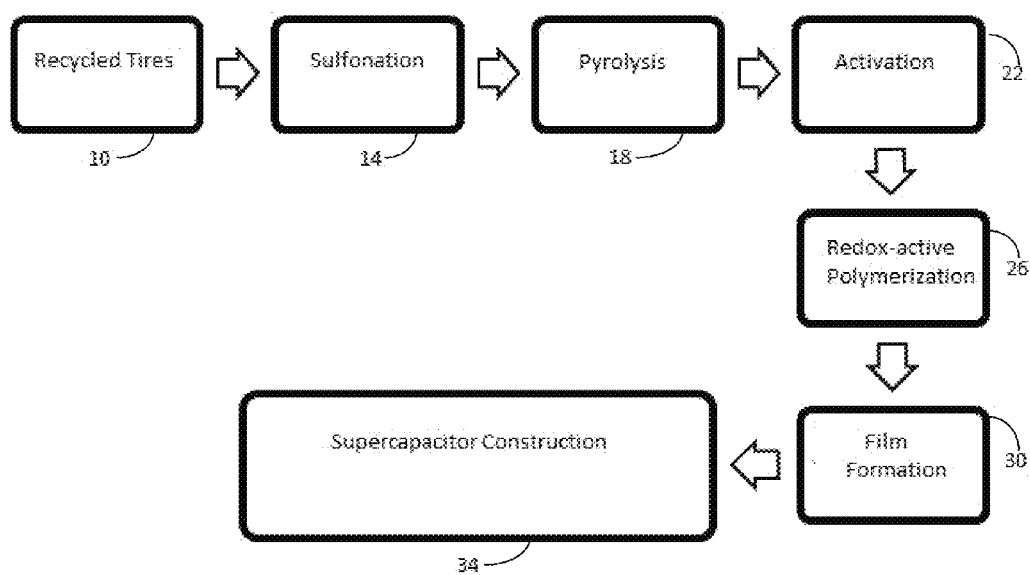
FIG. 1 is a schematic flow-chart of the preparation of activated tire-derived carbon using waste tires as a precursor, chemical activation to develop porosity and formation of the flexible film electrode and supercapacitor.

The process is shown schematically in FIG. 1. Recycled tires or rubber is provided in step 10. In step 14 the rubber pieces are sulfonated, and this is followed by pyrolysis step 18. The pyrolysis step is followed by an activation step 22 and a polymerization step 26 where a redox-active polymer is formed. This is followed by a film electrode formation step 30. The film electrode can then be assembled into a supercapacitor in step 34.

The method of sulfonating the rubber can vary. In one aspect, the temperature of the sulfonation bath can be between −20° C. to 200° C. The rubber pieces can be contacted with the sulfonation bath for between 30 minutes and 5 days. The sulfonation bath can include a concentration of sulfuric acid, or fuming sulfuric acid, or chlorosulfonic acid, or SO$_3$ gas containing fluid that is suited to the rubber composition and the conditions of the sulfonation.

The rubber pieces can be any suitable size, such as between 100 nm and 2 inches. The rubber pieces can comprise rubber particles of between 100 nm and 0.5 mm and rubber crumbs of between 0.5 mm to 2 inches.

The sulfonated tire rubber is pyrolyzed to produce a tire-derived carbon composite comprising carbon black embedded in carbon matrix with graphitized interface portions. The graphitized interface portions can comprise 10%-40% of the tire-derived carbon composite, by weight. The graphitized portion can comprise a layer spacing of between 3.5-4.7 angstroms. The presence of the outer graphitized shell preserves the carbon black within and raises yield and provides the correct pore volume characteristics.

The pyrolysis can be conducted by any suitable process. The pyrolyzing can comprise heating to at least 200° C. to 2400° C., or 900° C. to 1100° C. A temperature of about 1000° C. was found to produce favorable results. The pyrolyzing can comprise at least two-stage heating. A first stage heating can comprise heating to between room temperature and 400° C. at 1° C./min, and a second stage heating can comprise heating to between 400 and 2400° C. at 2° C./min. The heating rates in both stages can be as high as 50° C./min. The pyrolyzing time can be between 1 min and 24 hours. The pyrolyzing can be conducted in an inert atmosphere.

The tire-derived carbon composite is then activated by contacting the tire-derived carbon composite with a specific surface area-increasing composition or process to increase the specific surface area of the carbon to provide an activated tire-derived carbon composite. Many processes for activating carbon are known, and any suitable activation composition or method can be utilized. The activating step can comprise contacting the tire-derived carbon with at least one selected from the group consisting of KOH, CO$_2$, or ZnCl$_2$. The KOH can be mixed with the tire-derived carbon at a weight ratio of between 1:2 and 1:10.

The pore size after the activating step has a mixed meso-microporosity between 1-10 nm or between about 1-5 nm, with both micropores of less than 2 nm, and mesopores of preferably 3-5 nm, or 2-10 nm. There are preferably no pores of greater than 5 nm, or 6 nm, 7 nm, 8 nm 9 nm or 10 nm. The pores can have between 70%-90% micropores and between 10%-30% mesopores. The specific surface area after the activating step is between 1000-2000 m$^2$/g.

The activated tire-derived carbon composite is mixed with a monomer for preparing the redox-active polymer. The monomer is polymerized to produce a redox-active polymer coated, activated tire-derived carbon composite. Redox-active polymers are polymers bearing redox centers or groups. They are a group of polymers with non-conjugated backbone and redox-active centers localized in pendant groups. The redox centers, not the polymer chain generally govern the redox behavior. The reaction rate can be controlled by the applied potential or current. Conducting redox-active polymers such as polyaniline (PANI), polypyrrole (PPy) and polythiophene (PTh) have been extensively used in electrochemical supercapacitors, although other redox-active polymers can be used. The redox-active polymer can comprise 50%-90% of the redox-active polymer coated, activated tire-derived carbon composite, by weight.

The aniline, pyrrole, thiophene, or other monomer can be mixed with a suitable oxidant to polymerize the monomer. Suitable oxidants include ammonium persulfate, iron chloride, and potassium dichromate. Any suitable polymerization process and oxidant for the monomer can be used. The tire-derived carbon composite is mixed with monomer and oxidant at a ratio of (x) monomer:(y) oxidant:(z) tire-derived carbon composite of for example x=1-4 μl, y=1-4 mg, and z=1-10 mg. The proportions can be monomer 20-40%, oxidant 20-40%, and tire-derived carbon composite 30-50%, by weight.

The redox-active polymer coated, activated tire-derived carbon composite can be formed into a film. The film-forming step can include mixing the redox-active polymer coated, activated tire-derived carbon composite (80-90%), carbon black (5-10%), and a binder in a solvent (5-10%), evaporating the solvent to produce a film-forming mixture, and applying pressure to the film-forming mixture to form the film.

The redox-active polymer coated, activated tire-derived carbon film can be formed into an electrode with any suitable construction and by any suitable process. An electrode according to the invention comprises a tire-derived carbon composite comprising carbon black embedded in sulfonated rubber-based carbon matrix with graphitized interface portions and being activated, and coated with a redox-active polymer to provide a redox-active polymer coated, activated tire-derived carbon composite.

The electrode can be used to form a supercapacitor comprising the electrode. The supercapacitor can be made in two or three electrode configurations and/or can be a flexible supercapacitor. In the two-electrode setup, activated carbon can serve as a counter electrode and the composite film of the invention as a working electrode, while in a three-electrode setup, an Ag/AgCl counter electrode can be used. In a flexible supercapacitor, gel-type electrolytes can be employed.

A supercapacitor according to the invention includes an electrode, the electrode comprising a redox-active polymer coated, tire-derived carbon composite comprising carbon black embedded in sulfonated rubber-based carbon matrix with graphitized interface portions and being activated and coated with the redox-active polymer to provide a redox-active polymer coated, activated tire-derived carbon composite electrode. The supercapacitor can be formed into any suitable supercapacitor construction and by any suitable process.

The supercapacitor has capacitance retention of over 95% after 10,000 cycles. The supercapacitor has a capacitance of over 450 F/g at a scan rate of 1 mV/s, of over 200 F/g at a scan rate of 10 mV/s, and over 150 F/g at a scan rate of 100 mV/s. The electrodes are also highly flexible and conducting. The conductivity of the as-synthesized films varies between 50-200 S/m depending on the desired composition. The films can easily be bent to 180° position or beyond.

An experimental crumb tire rubber of irregular shapes (0.3-1 cm size) was used to derive carbon by soaking in concentrated sulfuric acid bath and subsequent washing. The washed sulfonated tire rubber was then pyrolyzed in a tubular furnace under a flowing nitrogen gas atmosphere. The temperature of the furnace was ramped up in two stages, from room temperature to 400° C. at 1° C./min and 400° C. to 1100° C. at 2° C./min followed by cooling to room temperature. The pyrolyzed residue yields up to 50% carbon by weight. To increase the SSA, as-produced carbon was mixed with potassium hydroxide, KOH pellets (Sigma-Aldrich) at a 1:4 weight ratio using a mortar and pestle followed by heating at 800° C. for 1 h under nitrogen flow. The activated tire-derived carbon (TC) was then washed with 10 wt. % HCl to remove the remaining salts and ashes, followed by thorough washing with the deionized water until the pH of the supernatant became neutral. TC was then oven-dried at 100° C. for 24 h.

A rapid mixing polymerization route was utilized to synthesize PANI/TC composites because it hampers the secondary growth of the PANI by diffusing away the polymerized carbon and provides more active sites for uniform polymerization. Aniline (>99.5%; Sigma-Aldrich) was polymerized at room temperature using ammonium peroxydisulfate (APS) (>98%; Fischer Scientific) as an oxidizing agent, with and without the presence of TC. Various compositions of the PANI and TC were tested for optimal electrochemical performance. Typically, 60 µl of aniline was dissolved in 10 ml of 1 M HCl solution and 60 mg of APS was dissolved in the same amount of HCl. 60 mg of TC was sonicated in 1 M HCl for 30 minutes prior to start of the synthesis followed by the rapid addition of aniline and APS solutions to the TC suspension. The whole mixture was vigorously stirred during the synthesis to ensure well mixing of both solutions before the start of polymerization. The change of the solution color from black to green (emeraldine salt) confirmed the start of the polymerization process. The reaction was carried out overnight and the resulting product was washed with ethanol/water and filtered until the solution reached a neutral pH value. A similar protocol was adopted to synthesize PANI without TC. The as-synthesized PANI/TC composite film is highly flexible and can be used directly in flexible energy storage devices. The whole process is scalable for the synthesis of PANI/TC composites for portable energy storage devices to large scale energy storage systems (e.g., flowable electrodes for grid energy storage).

Transmission electron microscopy (TEM) was performed with JEM-2100 (JEOL, Japan) using an accelerating voltage of 200 kV. Samples were sonicated in ethanol for 5 minutes prior to dropping 1-2 drops on copper grid for imaging. Gas sorption measurements were performed on Quadrasorb instrument (Quantachrome, USA) using nitrogen at −196° C. Brunauer-Emmett-Teller (BET) method and Density Functional Theory (DFT) models were used to determine SSA of all the investigated samples, using the adsorption data taken at relative pressure (P/Po) range of 0.05-0.2. Quench-solid density functional theory (QSDFT) was used to derive PSD by considering the slit-shaped pore geometry, while total pore volumes were calculated at $P/P_o$=0.99. Renishaw inVia Spectrometer with a 632 nm laser as the excitation source using 5% laser power was used during all the measurements. Fourier transform infrared spectroscopy (FTIR) was carried out on FTIR spectrometer (Perkin-Elmer) with a resolution of 4 (1/cm).

Film electrodes were prepared by mixing 90 wt. % active material with 5 wt. % carbon black (100% compressed; Alfa Aesar, USA) and 5 wt. % polytetrafluoroethylene (PTFE) binder (Sigma-Aldrich) in ethanol. After evaporation of ethanol, powder was rolled using a roller mill to prepare ~100 µm thick films. The AC (YP-50, Kuraray, Japan) electrodes having a thickness between 100-150 µm were prepared by mixing 95 wt. % AC and 5 wt. % PTFE binder. All electrochemical tests were performed in a three-electrode Swagelok® cell. TC or PANI/TC composite electrodes were used as the working, over-capacitive activated carbon films were used as the counter and Ag/AgCl was used as the reference electrode. Clegard membranes served as a separator and 1 M $H_2SO_4$ as the electrolyte. Electrochemical measurements were performed with cyclic voltammetry (CV), galvanostatic charging/discharging potential limiting (GCPL), and electrochemical impedance spectroscopy (EIS). Impedance measurements were performed at a sine wave signal amplitude of 10 mV in the frequency range of 200 kHz to 10 MHz. Capacitance and energy density values were calculated similar to our previous report.

Figure 2A:
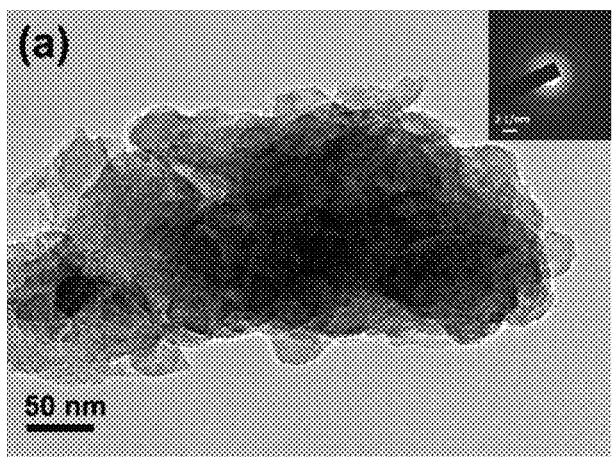
FIG. 2 is transmission electron microscopy images of (A) activated tire-derived carbon. Inset, selected area diffraction pattern showing that the as-synthesized carbon is mainly dominated by the amorphous phase, (B) PANI/TC composite with PANI coated on the activated tire-derived carbon (black arrows shows deposited thin film of PANI).
Figure 2B:
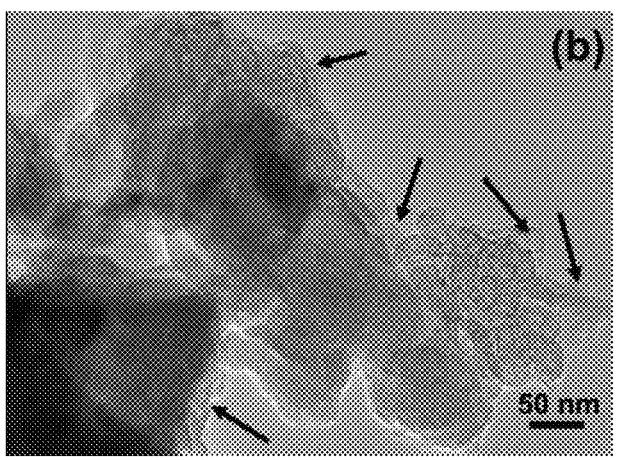

The morphology of the tire-derived activated carbon (TC) and PANI/TC was investigated with TEM. TC exhibited a three-dimensional, interconnected and random morphology (FIG. 2A). The selected area electron diffraction confirmed that amorphous phase dominates in the TC (inset, FIG. 2A). FIG. 2B demonstrates the uniform coverage of the TC with PANI after polymerization without any large agglomeration. The tire-derived carbon is uniformly mixed with PANI having a thickness of few nanometers. The good contact between TC and PANI may minimize the diffusion path lengths within the PANI/TC network, which may be favorable for the charge storage capacity of the electrodes.

Figure 3A:
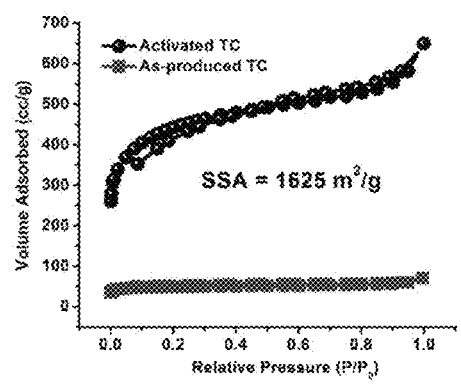
FIG. 3 is (A) nitrogen gas sorption isotherms of the as-prepared and activated tire-derived carbon, where activated tire-carbon exhibited a surface area of 1625 m$^2$/g, (B) corresponding pore size distributions, (C) Raman spectra showing D and G bands for the activated tire-derived carbon and various other bands corresponding PANI in the PANI/TC spectrum, (D) corresponding FTIR spectra.
Figure 3B:
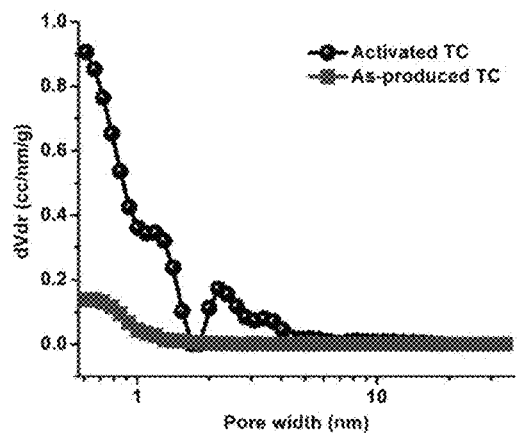

The sorption isotherms before and after the activation of tire-derived carbon are shown in FIG. 3A. Micropores are predominant in the activated tire-derived carbon (FIG. 3B). The SSA, calculated using the BET equation, was found to be 190 $m^2$/g for the as-prepared tire-carbon and increased to 1625 m²/g after activation; higher than several waste-derived carbons and comparable with commonly used commercial activated carbon, such as coconut shell derived YP-50. After activation at 800° C., the pore volume increased from 0.14 to 0.92 cc/g with the pore diameter being mainly <2 nm, although a small fraction of the porosity also originates from the mesopores (3.4 nm). Large pore volume and meso-microporosity are generally required characteristics for high charge storage.

Figure 3C:
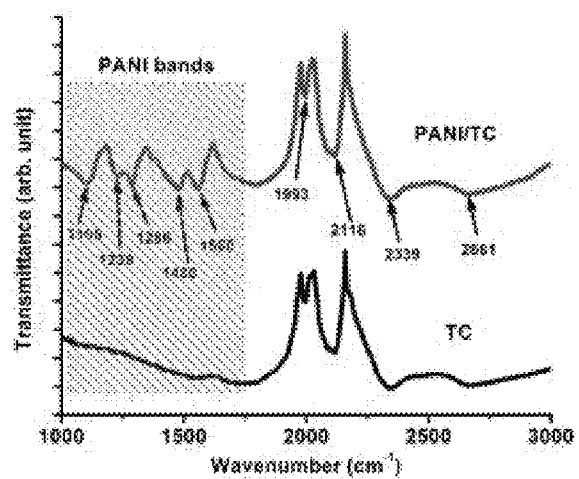
Figure 3D:
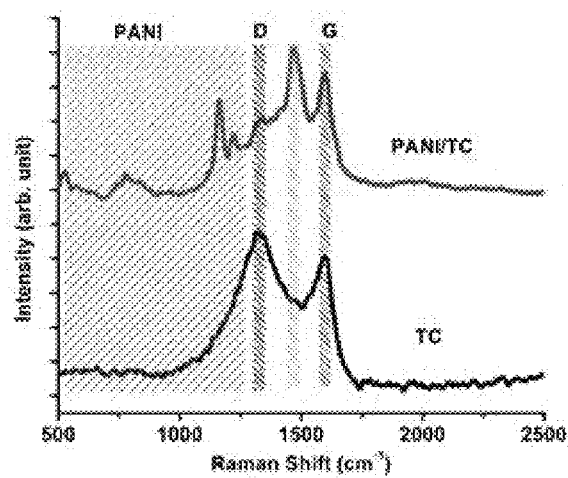

Raman spectra (FIG. 3C) of the TC showed D band at 1320 cm$^{-1}$ and G band at 1590 cm$^{-1}$. The higher intensity of the D band compared to the G band indicates developed degree of disorder in the TC structure, typical for the activated carbons. PANI/TC composite exhibited characteristic bands for both TC and PANI. Raman bands observed at 780, 838, 1161, 1218, 1417, 1470 and 1580 cm$^{-1}$ are assigned to the ring deformation of the quinoid ring, deformative vibrations of the amine group of PANI, quinoid ring vibration, stretching of C—N, stretching of the C=C in quinoid ring, stretching of C=N and stretching of C—C, respectively (FIG. 3C). The FTIR bands (FIG. 3D) for PANI were observed at 1105, 1239, 1296, 1480, 1560, which are assigned to the vibrational band of nitrogen quinine, N—H stretching in connecting benzene ring-quinoid ring, C—N stretching band of an aromatic amine, benzene ring deformation and quinoid ring stretching, respectively. The peak at 1105 cm$^{-1}$ confirmed that PANI is in the conducting form in the composite. In addition, common FTIR bands appearing both in TC and PANI/TC spectra at 2116, 2339 and 2661 are assigned to symmetric stretching bands of CO, ambient $CO_2$ and OH stretching of the carboxylic groups.

Figure 4A:
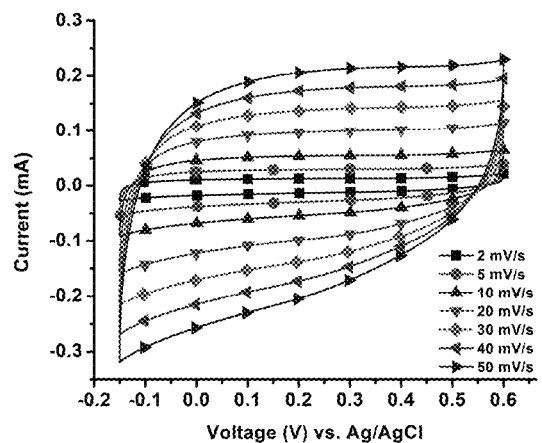
FIG. 4 is (A) cyclic voltammetry data (CVs) of the activated tire-derived carbon at various scan rates, (B) galvanostatic charging/discharging potential limiting (GCPL) plots at different current densities, (C) CVs of PANI/TC at various scan rates between 5-100 mV/s, (D) discharge plots of GCPL at various current densities, where the inset shows multiple charge/discharge cycles at 10 A/g, (E) electrochemical impedance spectroscopy (EIS) profile of TC and PANI/TC composite, and (F) rate performance of the activated tire-derived carbon and PANI/TC composite at scan rates between 1-200 mV/s.

Cyclic voltammetry was performed on the TC electrodes in 1 M $H_2SO_4$ at various scan rates between 1-100 mV/s in the voltage range of 0.6 to −0.15 V, to assess the charge storage capacity. A nearly rectangular shape CV was observed at all the sweep rates without any distortion/redox peaks, a characteristics of the capacitive (double layer formation) charge storage (FIG. 4A). The capacitance values at 1 mV/s were found to be 135 F/g, comparable with commercial high surface area activated carbons. The enhanced capacitance of the TC is attributed to the high SSA and narrow porosity, which are critical for the adsorption of the electrolyte ions. It is known that the dissociation of the sulfuric acid in water yields sulfate ($SO_4^{2-}$) and hydronium ions ($H_3O+$), having the hydrated ion size of 0.53 nm and 0.42 nm, respectively. PSD of the TC confirmed that these hydrated ions can confine in the micropores to form the double layer in the microporous network of the TC (FIG. 3B). The fraction of the mesopores present in the TC will assist the transportation of ions from the surface to the bulk for easier access to the microporous network. Nevertheless, TC exhibited high SSA, narrow PSD, large pore volume, which led to high charge storage capacity.

Figure 4B:
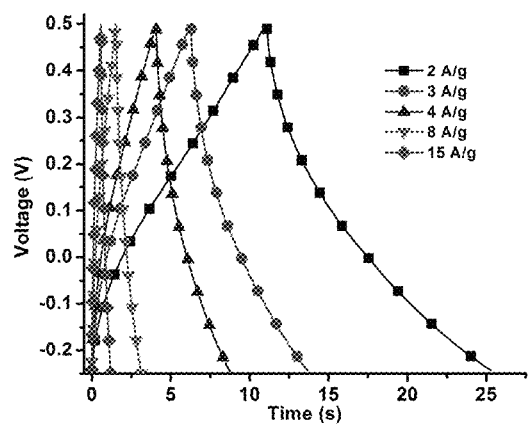

GCPL curves of TC electrodes (FIG. 4B) at different current densities (2, 3, 4, 8 and 15 A/g) remained triangular/symmetrical—a characteristic of the capacitive behavior. Almost negligible IR drop for all the current densities was observed indicating a high electrochemical reversibility, low equivalent series resistance (ESR) values and good coulombic efficiency. This behavior can be attributed to the low electronic resistance and improved penetration of the electrolyte ions through meso-microporous channels during charging/discharging of the electrodes.

Despite numerous physical and electrochemical advantages of the activated carbons, one major limitation is their poor energy density. The invention enhances the energy density by depositing organic conducting redox-active molecules on the subsurface and inner pores of the high surface area carbons to add faradic charge storage to the total capacitance of the electrodes. Organic redox-active molecules/polymers are favored due to their moderate cost, scalability, flexibility, organic nature and facile tailoring of their properties at molecular level. Unfortunately, they have poor stability upon charging/discharging, which hinders their application in energy storage devices. The major challenge for the development of conducting polymer/carbon composites is therefore to synthesize inexpensive, environmentally benign and high performance pseudocapacitive materials that offer longer cycling stability.

Figure 4C:
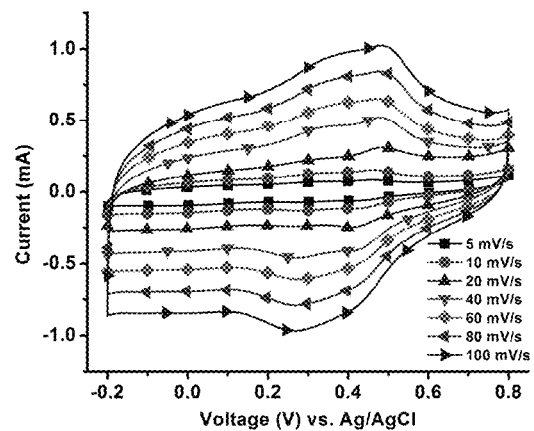

CV curves of the PANI/TC electrodes at various sweep rates between 5-100 mV/s in the potential range of −0.2 to 0.8 V are shown in FIG. 4C. In contrast to FIG. 4A, CVs of the PANI/TC composite electrodes exhibited two distinct redox peaks, which stem from the pseudocapacitive PANI on the microporous TC. These peaks are attributed to the redox transitions of the PANI between leucoemeraldine/emeraldine and emeraldine/pernigraniline. CVs of the composite material exhibited both faradic and EDL charge storage representative of PANI and TC contributions. Flat ends of CVs indicate capacitive contribution, while redox peaks corresponds to PANI contribution, which shows that large portion of the capacitance is originating from the pseudocapacitive contribution of the PANI. Various compositions (monomer:TC ratios) were prepared and electrochemically characterized. The optimum electrochemical performance was attained when a composition of 60 µl of aniline, 60 mg of APS, and 60 mg of TC was used during the synthesis process. The capacitance of this composite was found to be 480, 390, 285, 235, 210, 180 and 160 F/g at 1, 2, 5, 10, 20, 50 and 100 mV/s, respectively.

Across all the sweep rates, CVs of the PANI/TC composite remained rectangular with clear redox peaks confirming higher activity and stability of the PANI even at high scan rates, which is in sharp contrast to many published reports, where CVs were distorted at moderate scan rates. The high capacitance of the composite can be attributed to the uniform and thin coating of the PANI. Moreover, the 3D porous architecture of the composite offers higher conductivity (for good rate performance) and higher accessibility and shorter pathways for fast ion and charge transport. Poor accessibility of the electrolyte ions led to decline in capacitance at higher scan rates, a common characteristic of the electrochemical energy storage devices. Nevertheless, PANI/TC composite demonstrated the synergistic impact of both TC and PANI showing high capacitance, outperforming many previous reports.

Figure 4D:
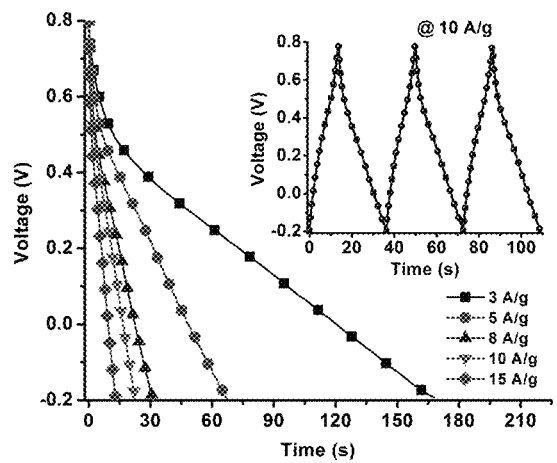
Figure 4E:
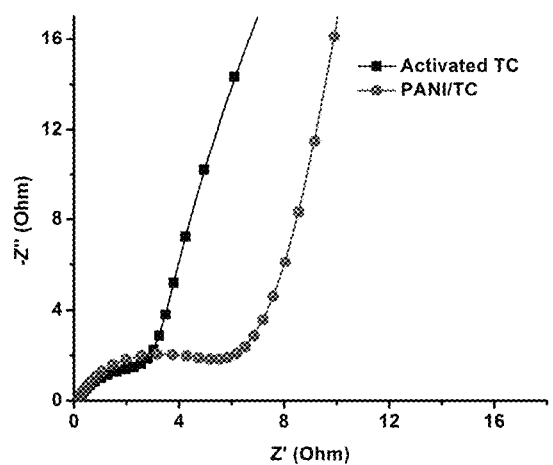

GCPL of PANI/TC electrodes (FIG. 4D) at various current densities (3, 5, 8, 10 and 15 A/g) showed two distinct voltage stages between 0.8 V to 0.5 V and 0.5 V to −0.2 V. The first linear potential stage of the discharge plot can be assigned to the double layer capacitance from TC, while the other can be ascribed to the combined double layer and Faradic contribution of the PANI on microporous TC. The discharge time of the PANI/TC electrodes was increased by decreasing the current density indicating good ion accessibility at low current densities, and vice versa. The symmetric charge/discharge curves reveal high electrochemical reversibility and good coulombic efficiency of the PANI/TC composite. (FIG. 4D, inset). Moreover, charge transfer resistance (Rct) from the Nyquist plot (FIG. 4E) was found to be 3Ω and 6Ω for TC and PANI/TC electrodes, respectively (45Ω was measured for pristine PANI electrodes). The relatively lower $R_{ct}$ values of the PANI/TC compared to PANI can be attributed to the improved conductivity, which confirm enhanced rate capability and power performance of the tested electrodes. Both TC and PANI/TC exhibited near vertical line in the low frequency region of the Nyquist plot, which indicate capacitive behavior of the electrodes. The appearance of the semi-circle for PANI/TC electrodes indicate occurrence of the Faradic processes.

Figure 4F:
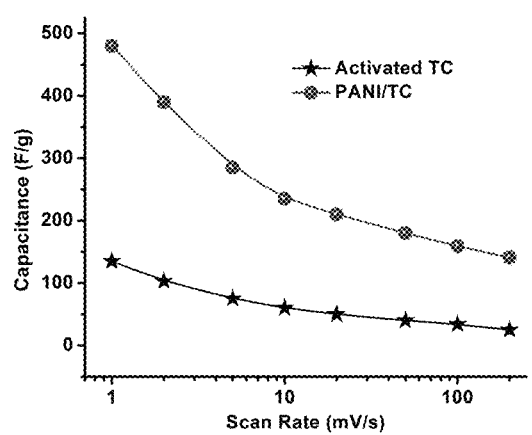

The rate performance of the TC and PANI/TC at various scan rates between 1-200 mV/s is shown in FIG. 4F. As-produced carbon exhibited capacitance of 65 F/g at 1 mV/s, which was later increased to 135 F/g after chemical activation. PANI/TC electrodes exhibited high capacitance of 480 F/g, more than 3.5 times higher than the TC, due to pseudocapacitive contribution of the PANI. The corresponding energy density for the PANI/TC composite was found to be 17 Wh/kg, 386% higher than the TC (3.5 Wh/kg). The increase in capacitance and thus energy density stem from the uniform coverage of the TC with PANI, improved electronic conductivity and low diffusion pathways for charge percolation.

Figure 5:
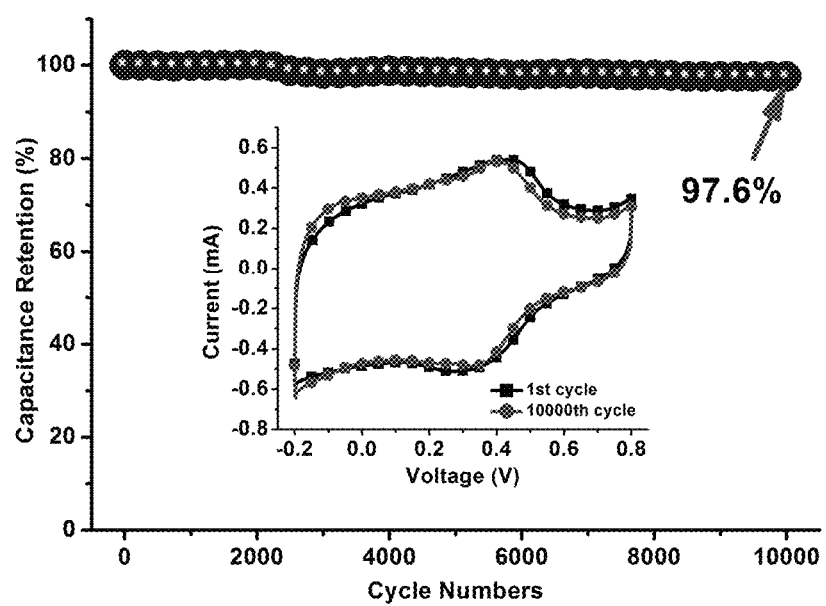
FIG. 5 is cycling performance of the PANI/TC composite electrode at 50 mV/s in 1 M H$_2$SO$_4$, where the inset shows similar shapes of the CV obtained in 1st and 10,000th cycle, clearly indicating negligible degradation of the PANI in the composite during cycling.

Poor cycle life because of the degradation of the PANI upon cycling is the key issue of PANI-containing pseudocapacitive electrodes. Table 1 summarizes and compares the capacitance retentions of various PANI based composites with different types of carbons (e.g., CNTs, rGO, commercial carbons, etc.) and various metal oxides. All PANI based composites (Table 1) with various carbons/metal oxides exhibited decay in capacitance after moderate cycling. FIG. 5 demonstrates the cycle life performance of the PANI/TC composite up to 10,000 cycles. Significantly, the PANI/TC composite exhibited excellent capacitance retention up to 98%, even after 10,000 cycles at 50 mV/s. These capacitance retention values are among the best reported for any PANI/activated carbon composite. Moreover, the tire carbon substrate used is highly sustainable and avoids environmentally hazardous synthesis procedures that are common for other carbon substrates (Table 1). The high capacitance retention of the PANI/TC composite may be attributed to: 1) hierarchical meso-microporous active carbon network, which tightly confined the PANI and served as a framework to avoid degradation of PANI, 2) good conductivity of TC provided conductive support to PANI when it was in electrochemically inactive state to ensure facile charge transport, which assisted to avoid degradation; 3) three-dimensional interconnected structure of the TC provided more active sites and better connectivity for the ion buffering/transport, which ensured the continuous charge transport and hindered the degradation of the PANI and 4) thin, uniform coating and strong π-π interactions of the PANI with the basal plane as well as in the inner pores of the TC served as the shallow traps for the PANI molecules, which minimized the degradation of the PANI and led to longer cycling performance. Comprehensive physical and electrochemical characteristics of the PANI/TC composite demonstrates the potential as a moderate cost, scalable and environmental benign composite for the portable electronics, flexible devices and large scale applications.

| Type of electrode material | Supporting electrolyte | Scan rate or current density | Cycling stability (% retention after) |
|---|---|---|---|
| Graphene/PANI paper | 1M H2SO4 | 5 A/g | 82 (1000 cycles) |
| Graphene/PANI nanofibers | 1M H2SO4 | 3 A/g | 79 (800 cycles) |
| PANI nanowires/GO | 1M H2SO4 | 1 A/g | 92 (2000 cycles) |
| 3D PANI/Graphene | 1M H2SO4 | 100 mV/s | 85 (1500 cycles) |
| Crosslinked PANI nanorods | 1M H2SO4 | 100 mV/s | 65 (1500 cycles) |
| PANI/MWCNTs | 1M H2SO4 | 5 mV/s | 70 (700 cycles) |
| PANI/Carbon nanocoil | 1M H2SO4 | 2.5 A/g | 72 (2000 cycles) |
| PANI/RuO2 | 1M H2SO4 | 10 A/g | 88 (10,000 cycles) |
| PANI/Carbon spheres | 1M H2SO4 | 1 A/g | 73 (1000 cycles) |
| MoO3/PANI | 1M H2SO4 | 20 mV/s | 50 (200 cycles) |
| PANI/TC | 1M H2SO4 | 50 mV/s | 98 (10,000 cycles) |

The invention utilizes high surface area conducting carbons derived from the solid waste tires as a substrate for an organic-based supercapacitor. This carbon material is abundant, inexpensive and environmentally benign. Sulfuric acid treatment followed by pyrolysis of the shredded tire was carried out at 1100° C.; recovered carbon was subsequently chemically activated to develop the porosity. The activated TC exhibited mixed 3D meso-microporous network with a high surface area of 1625 $m^2/g$. When tested as a supercapacitor electrode, it showed a high charge storage capacity of 135 F/g at 1 mV/s, comparable to the commercial carbons. The PANI/TC composite film was highly compatible, conductive, could be easily bent, rolled or used as a flat sheet in the devices. When tested as the pseudocapacitive electrode, PANI/TC film showed a capacitance of 480 F/g at 1 mV/s, a 256% higher capacitance than the activated TC. PANI/TC composite demonstrated excellent capacitance retention of up to 98%, outperforming all the PANI-based composites with activated carbons. The negligible capacitance loss was due to the tight confinement of the PANI within the inner pores of TC, which served as shallow traps for the PANI entrapment via π-π interactions, and led to the structural stability of PANI during charging/discharging. The waste tire-derived carbon of the invention shows promising results for capacitive charge storage as well as an excellent conductive 3D nano-scaffold for the deposition of the redox polymers for Faradic capacitance. The narrow pore size distribution (PSD) and high surface area lead to a good charge storage capacity, especially when used as three-dimensional nanoscaffold to polymerize polyaniline (PANI/TC) or other redox-active polymers. The high capacitance and long cycle life are, without wishing to be limited, ascribed to the short diffusional paths, uniform redox-active polymer coating and tight confinement of the redox-active polymer in the inner pores of the tire-derived carbon via π-π interactions, which minimize the degradation of the redox-active polymer such as PANI upon cycling.

Owing to PANI/TC high conductivity, facile synthesis procedure and flexibility, these composites can be used in various applications such as li-ion batteries, sensors and actuators. Moreover, as-developed PANI/TC or combination of TC with other redox-active polymers and/or metal oxides may find their application in the large scale energy storage systems such as electrochemical flow capacitors, where materials with moderate cost and higher energy density are critically required.

Ranges: throughout this disclosure, various aspects of the invention can be presented in a range format. It should be understood that the description in the range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range for example, 1, 2, 2.7, 3, 4, 5, 5.3 and 6. This applies regardless of the bread of the range.

This invention can be embodied in other forms without departing from the spirit or essential attributes thereof, and accordingly, reference should be had to the following claims to determine the scope of the invention.

We claim:

1. A method of making a supercapacitor from waste tires, comprising the steps of:
    providing rubber pieces;
    contacting the rubber pieces with a sulfonation bath to produce sulfonated rubber;
    pyrolyzing the sulfonated rubber to produce tire-derived carbon composite comprising carbon black embedded in sulfonated rubber-based carbon matrix with graphitized interface portions, wherein the pyrolyzing comprises heating to at least 200° C.-2400° C., and comprises at least two stage heating at heating rates between 1 and 20° C./min;
    activating the tire-derived carbon composite by contacting the tire-derived carbon composite with a specific surface area-increasing composition to increase the specific surface area of the carbon composite to provide activated tire-derived carbon composite;
    mixing the activated tire-derived carbon composite with a monomer and polymerizing the monomer to produce a redox-active polymer coated, activated tire-derived carbon composite; and,
    forming the redox-active polymer coated, activated tire-derived carbon composite into a film.

2. The method of claim 1, further comprising the step of forming the redox-active polymer coated, activated tire-derived carbon film into an electrode.

3. The method of claim 2, further comprising the step of forming a supercapacitor comprising the electrode.

4. The method of claim 3, wherein the supercapacitor is a pseudocapacitor.

5. The method of claim 1, wherein the graphitized interface portions comprise 10%-40% of the tire-derived carbon composite, by weight.

6. The method of claim 1, wherein the temperature of the sulfonation bath is between −20° C. to 200° C.

7. The method of claim 1, wherein the rubber pieces are contacted with the sulfonation bath for between 30 minutes and 5 days.

8. The method of claim 1, wherein a first stage heating comprises heating to between room temperature and 400° C. at 1° C./min, and a second stage heating comprises heating to between 400 and 2400° C. at 2° C./min.

9. The method of claim 1, wherein the pyrolyzing time is between 1 min and 24 hours.

10. The method of claim 1, wherein the activating step comprises contacting the tire-derived carbon with at least one selected from the group consisting of KOH, CO2 or ZnCl2.

11. The method of claim 10, wherein KOH is mixed with the tire-derived carbon at a weight ratio of between 1:2 and 1:10.

12. The method of claim 1, wherein the pore size after the activating step includes micropores of less than 2 nm, and mesopores of 2-10 nm.

13. The method of claim 12, wherein the mesopores are 3-5 nm.

14. The method of claim 12, wherein the pores are between 70%-90% micropores and between 10%-30% mesopores.

15. The method of claim 1, wherein the specific surface area after the activating step is between 1000-2000 m²/g.

16. The method of claim 1, wherein the rubber pieces are between 100 nm and 2 inches.

17. The method of claim 1, wherein the rubber pieces comprise rubber particles of between 100 nm and 0.5 mm and rubber crumbs of between 0.5 mm to 2 inches.

18. The method of claim 1, wherein the pyrolyzing is conducted in an inert atmosphere.

19. The method of claim 1, wherein graphitized portion comprises a layer spacing of between 3.5-4.7 angstroms.

20. The method of claim 1, wherein the redox-active polymer comprises at least one selected from the group consisting of polyaniline, polypyrrole, and polythiophene.

21. The method of claim 1, wherein the electrode has capacitance retention of over 95% after 10,000 cycles.

22. The method of claim 1, wherein the polymer comprises 50%-90% of the redox-active polymer coated, activated tire-derived carbon composite, by weight.

23. The method of claim 1, wherein the conductivity of the films is between 50-200 S/m.

24. The method of claim 1, wherein the films can be bent to 180°.

25. The method of claim 1, wherein the tire-derived carbon is mixed with monomer and oxidant at a ratio of (x) Monomer:(y) Oxidant:(z) tire-carbon where x=20-40%, y=20-40%, and z=30-50%.

26. A method of making a supercapacitor from waste tires, comprising the steps of:
    providing rubber pieces;
    contacting the rubber pieces with a sulfonation bath to produce sulfonated rubber;
    pyrolyzing the sulfonated rubber to produce tire-derived carbon composite comprising carbon black embedded in sulfonated rubber-based carbon matrix with graphitized interface portions;
    activating the tire-derived carbon composite by contacting the tire-derived carbon composite with a specific surface area-increasing composition to increase the specific surface area of the carbon composite to provide activated tire-derived carbon composite;
    mixing the activated tire-derived carbon composite with a monomer and polymerizing the monomer to produce a redox-active polymer coated, activated tire-derived carbon composite; and,
    forming the redox-active polymer coated, activated tire-derived carbon composite into a film;
wherein the tire-derived carbon is mixed with monomer and oxidant at a ratio of (x) Monomer:(y) Oxidant:(z) tire-carbon where x=20-40%, y=20-40%, and z=30-50%.

27. The method of claim 26, wherein the oxidant is at least one selected from the group consisting of ammonium persulfate, iron chloride, and potassium dichromate.

28. The method of claim 26, further comprising the step of forming the redox-active polymer coated, activated tire-derived carbon film into an electrode.

29. The method of claim 28, wherein the electrode has capacitance retention of over 95% after 10,000 cycles.

30. The method of claim 28, wherein the electrode has a capacitance of over 450 F/g at a scan rate of 1 mV/s, of over 200 F/g at a scan rate of 10 mV/s, and over 150 F/g at a scan rate of 100 mV/s.

31. The method of claim 26, wherein the graphitized interface portions comprise 10%-40% of the tire-derived carbon composite, by weight.

32. The method of claim 26, wherein the pyrolizing comprises at least two stage heating at heating rates between 1 and 20° C./min.

33. The method of claim 26, wherein the pore size after the activating step includes micropores of less than 2 nm, and mesopores of 2-10 nm.

34. The method of claim 33, wherein the pores are between 70%-90% micropores and between 10%-30% mesopores.

35. The method of claim 26, wherein the redox-active polymer comprises at least one selected from the group consisting of polyaniline, polypyrrole, and polythiophene.

36. The method of claim 26, wherein the conductivity of the films is between 50-200 S/m.

37. A method of making a supercapacitor from waste tires, comprising the steps of:
providing rubber pieces;
contacting the rubber pieces with a sulfonation bath to produce sulfonated rubber;
pyrolyzing the sulfonated rubber to produce tire-derived carbon composite comprising carbon black embedded in sulfonated rubber-based carbon matrix with graphitized interface portions;
activating the tire-derived carbon composite by contacting the tire-derived carbon composite with a specific surface area-increasing composition to increase the specific surface area of the carbon composite to provide activated tire-derived carbon composite;
mixing the activated tire-derived carbon composite with a monomer and polymerizing the monomer to produce a redox-active polymer coated, activated tire-derived carbon composite;
forming the redox-active polymer coated, activated tire-derived carbon composite into a film, and forming the film into an electrode; and,
wherein the electrode has a capacitance of over 450 F/g at a scan rate of 1 mV/s, of over 200 F/g at a scan rate of 10 mV/s, and over 150 F/g at a scan rate of 100 mV/s.

38. The method of claim 37, wherein the supercapacitor is a pseudocapacitor.

39. The method of claim 37, wherein the graphitized interface portions comprise 10%-40% of the tire-derived carbon composite, by weight.

40. The method of claim 37, wherein the pyrolizing comprises at least two stage heating at heating rates between 1 and 20° C./min.

41. The method of claim 37, wherein the pore size after the activating step includes micropores of less than 2 nm, and mesopores of 2-10 nm.

42. The method of claim 37, wherein the pores are between 70%-90% micropores and between 10%-30% mesopores.

43. The method of claim 37, wherein the tire-derived carbon is mixed with monomer and oxidant at a ratio of (x) Monomer:(y) Oxidant:(z) tire-carbon where x=20-40%, y=20-40%, and z=30-50%.

44. The method of claim 37, wherein the redox-active polymer comprises at least one selected from the group consisting of polyaniline, polypyrrole, and polythiophene.

45. The method of claim 37, wherein the electrode has capacitance retention of over 95% after 10,000 cycles.

46. The method of claim 37, wherein the electrode has a capacitance of over 450 F/g at a scan rate of 1 mV/s, of over 200 F/g at a scan rate of 10 mV/s, and over 120 F/g at a scan rate of 100 mV/s.

47. The method of claim 37, wherein the conductivity of the films is between 50-200 S/m.

48. A method of making a supercapacitor from waste tires, comprising the steps of:
providing rubber pieces;
contacting the rubber pieces with a sulfonation bath to produce sulfonated rubber;
pyrolyzing the sulfonated rubber to produce tire-derived carbon composite comprising carbon black embedded in sulfonated rubber-based carbon matrix with graphitized interface portions;
activating the tire-derived carbon composite by contacting the tire-derived carbon composite with a specific surface area-increasing composition to increase the specific surface area of the carbon composite to provide activated tire-derived carbon composite;
mixing the activated tire-derived carbon composite with a monomer and polymerizing the monomer to produce a redox-active polymer coated, activated tire-derived carbon composite;
forming the redox-active polymer coated, activated tire-derived carbon composite into a film; and,
wherein the film-forming step comprises mixing the redox-active polymer coated, activated tire-derived carbon, carbon black, and a binder in a solvent, evaporating the solvent to produce a film-forming mixture, and applying pressure to the film-forming mixture to form the film.

49. The method of claim 48, further comprising the step of forming the redox-active polymer coated, activated tire-derived carbon film into an electrode.

50. The method of claim 49, wherein the electrode has capacitance retention of over 95% after 10,000 cycles.

51. The method of claim 49, wherein the electrode has a capacitance of over 450 F/g at a scan rate of 1 mV/s, of over 200 F/g at a scan rate of 10 mV/s, and over 150 F/g at a scan rate of 100 mV/s.

52. The method of claim 48, wherein the supercapacitor is a pseudocapacitor.

53. The method of claim 48, wherein the pyrolizing comprises at least two stage heating at heating rates between 1 and 20° C./min.

54. The method of claim 48, wherein the pore size after the activating step includes micropores of less than 2 nm, and mesopores of 2-10 nm.

55. The method of claim 54, wherein the pores are between 70%-90% micropores and between 10%-30% mesopores.

56. The method of claim 48, wherein the tire-derived carbon is mixed with monomer and oxidant at a ratio of (x) Monomer:(y) Oxidant:(z) tire-carbon where x=20-40%, y=20-40%, and z=30-50%.

57. The method of claim 48, wherein the redox-active polymer comprises at least one selected from the group consisting of polyaniline, polypyrrole, and polythiophene.

58. The method of claim 48, wherein the conductivity of the films is between 50-200 S/m.

* * * * *